United States Patent

Kobayashi et al.

[11] Patent Number: 5,846,372
[45] Date of Patent: Dec. 8, 1998

[54] METHOD OF MANUFACTURING A MAT FOR DECORATIVE AGGREGATE EXPOSED FINISHES

[75] Inventors: Teruaki Kobayashi, Fuchu; Yoshikazu Okada; Tetsuo Hamaguchi, both of Kawasaki; Hiroyuki Ogawa; Kazuhisa Ishigaki, both of Fuchu, all of Japan

[73] Assignees: Sliontec Corporation, Kanagawa-ken; Seltec Corporation, Tokyo, both of Japan

[21] Appl. No.: 870,421

[22] Filed: Jun. 5, 1997

[30] Foreign Application Priority Data

Jun. 6, 1996 [JP] Japan ................... 8-144017

[51] Int. Cl.6 ............... B29K 103/08; B32B 33/00; B32B 31/26; E01C 11/24
[52] U.S. Cl. ............. 156/309.6; 156/279; 264/DIG. 31
[58] Field of Search .................. 156/63, 71, 72, 156/278, 279, 308.2, 309.6; 264/74, 76, 108, DIG. 19, DIG. 20, DIG. 25, DIG. 31

[56] References Cited

U.S. PATENT DOCUMENTS

| | | | |
|---|---|---|---|
| 4,282,697 | 8/1981 | Spielau et al. | 52/746 |
| 4,308,308 | 12/1981 | Sachse | 428/168 |
| 4,435,469 | 3/1984 | Fay | 428/285 |
| 4,447,490 | 5/1984 | Ventker et al. | 428/285 |
| 5,106,441 | 4/1992 | Brosig et al. | 156/104 |
| 5,516,573 | 5/1996 | George et al. | 428/143 |

FOREIGN PATENT DOCUMENTS 64-33354A  2/1989  Japan .

*Primary Examiner*—Francis J. Lorin
*Attorney, Agent, or Firm*—Birch, Stewart Kolasch & Birch, LLP

[57] ABSTRACT

To provide a practical mat for decorative aggregate exposed finishes applying for decorative finished concretes or the like and a method of industrially manufacturing a novel mat for decorative aggregate exposed finishes carrying a wide variety of decorative aggregates such as made of natural stones, ceramics, glass and plastics. A practical mat for decorative aggregate exposed finishes according to this invention is made through following steps; placing a hot melt adhesive film on one surface of soft and flexible decorative aggregate carrying net having a mesh size smaller than the particle size of decorative aggregates and greater than 2 mm, placing decorative aggregates on the hot melt adhesive film, and heating them entirely to a temperature higher than the melting point of the hot melt adhesive, thereby adhesively bonding the decorative aggregates and the carrying net for reinforcement firmly.

3 Claims, 2 Drawing Sheets

↓ HEATING

↓ HEATING

METHOD OF MANUFACTURING A MAT FOR DECORATIVE AGGREGATE EXPOSED FINISHES

BACKGROUND OF THE INVENTION

1. Field of the Invention

The present invention concerns a method of manufacturing a mat for decorative aggregate exposed finishes concretes decorated at the surface with decorative aggregates such as natural stones, ceramics, glass and plastics.

2. Description of the Prior Art

Aggregate exposed finishing is a method of exposing various kinds of natural stones or artificial stones (referred to as aggregates) to the surfaces of concrete. This includes two methods, namely, a method of placing at job sites and a method of applying, at job sites, products prepared by previously exposing aggregates in a factory.

The method of placing at job sites includes a method of placing mortar uniformly on already applied concretes and burying aggregates individually and a method of uniformly placing aggregate kneaded mortar on already applied concretes and washing out mortar on the surface layer before hardening of the concretes, thereby exposing the aggregates on the surfaces of the concretes.

For carrying out the aggregate exposed finishing by the method of placing at job site simply and uniformly, use of a mat for decorative aggregate exposed finishes prepared by fixing aggregates on a net with adhesives has been proposed (Japanese Patent Laid-Open Sho 64-33354). By the use of this mat, the aggregate exposed finishing can be conducted simply as compared with the existent method of burying aggregates individually or the method of washing out the surfaces of aggregate kneaded mortar.

The conventional mat for decorative aggregate exposed finishes is prepared by bonding the aggregates and the net by means of adhesives such that they are not detached. Further, the constitution of the mat for decorative aggregate exposed finishes has been proposed in the prior art, but no actual products have yet been commercially sold and no practical manufacturing method has yet been proposed. Accordingly, there is a demand for the development of a method capable of industrially manufacturing a mat for decorative aggregate exposed finishes.

OBJECT AND SUMMARY OF THE INVENTION

An object of the present invention is to overcome the foregoing problems in the prior art and provide a method of industrially manufacturing a novel mat for decorative aggregate exposed finishes carrying a wide variety of decorative aggregates such as made of natural stones, ceramics, glass and plastics.

The foregoing object of the present invention can be attained by a method of manufacturing a mat for decorative aggregate exposed finishes, which comprises placing a hot melt adhesive film on one surface of soft and flexible decorative aggregate carrying net having a mesh size smaller than the particle size of decorative aggregates and greater than 2 mm, placing decorative aggregates on the hot melt adhesive film, and heating them entirely to a temperature higher than the melting point of the hot melt adhesive, thereby adhesively bonding the decorative aggregates and the carrying net firmly.

In another aspect in accordance with the present invention, there is provided a method of manufacturing a mat for decorative aggregate exposed finishes, which comprises placing decorative aggregate carrying net having a mesh size of smaller than the particle size of decorative aggregates and greater than 2 mm, on a supporting net having a mesh size of greater than 2 mm, placing a hot melt adhesive film on the upper surface of the decorative aggregate carrying net, placing decorative aggregates on the hot melt adhesive film and heating the entire portion to a temperature higher than the melting point of the hot melt adhesive, thereby adhesively bonding the decorative aggregates with the decorative aggregate carrying net and the supporting net simultaneously and firmly.

In a preferred embodiment of the method of manufacturing a mat for decorative aggregate exposed finishes, the decorative aggregates carrying net or the supporting net are made of at least one of the fibers selected from the group consisting of alkali resistant glass fibers, carbon fibers, aramide fibers, polyester fibers, vinylon fibers, nylon fibers, and polypropylene fibers.

There are various methods for bonding the decorative aggregate carrying net and the decorative aggregates with the adhesive example, a method of coating an adhesive (including a pressure sensitive adhesive) on the net and urging decorative aggregates while the adhesive is still in a liquid state and keeping tackiness, thereby curing the adhesive, urging the decorative aggregates with the adhesive onto the net and then curing the adhesive, or depositing a hot melt adhesive on decorative aggregates, placing them on the net and bonding them by heating or depositing a hot melt adhesive on a net, placing decorative aggregates thereon and then bonding them by heating.

Among the bonding methods described above, the method of bonding the decorative aggregates to the net with the liquid adhesive has a drawback in causing the difficulty of bonding operation. The method of previously depositing the hot melt adhesive to the decorative aggregates or the net is relatively simple in the bonding operation but it is not easy to previously deposit a great amount of the adhesive to the surface of the aggregates or the net for adhesively boding the highly uneven aggregates to the net firmly.

The method of manufacturing a net for decorative aggregates exposed finishes according to the present invention has a feature in the use of a hot melt adhesive film for simple and firm adhesive bonding decorative aggregates to a net.

By placing the hot melt adhesive film between the decorative aggregate carrying net and the decorative aggregates and heating the film to a temperature higher than the melting point thereof, the hot melt adhesive film is melted and intrudes completely between the decorative aggregate carrying net and the decorative aggregates, so that both of them can be adhesively bonded reliably after cooling the entire portion. In this case, if the hot melt adhesive film is set to an appropriate thickness, the mesh of the net is not clogged by the molten hot melt adhesive film when melted and gathered on the fibers of the decorative aggregate carrying net and the decorative aggregates. This is the indispensable condition for keeping the mesh open for allowing mortar to pass through the mesh at the time of applying the mat for decorative aggregate exposed finishing.

Further, if the hot melt adhesive film is made porous or fabricated into a state of containing a number of bubbles, the mesh can be kept open more easily and reliably.

Further, the mat for decorative aggregate exposed finishes may be manufactured, when it is small in the size, by using only the decorative aggregate carrying net. However, if the mat is large in the size, it sometimes results in a problem, for example, deformation of the mat by the weight of the aggregates during handling. As a countermeasure, the decorative aggregate carrying net may preferably be backed with a supporting net. When the decorative aggregate carrying net is placed on the supporting net and melt-bonded by using the hot melt adhesive film molten film intrudes between the decorative aggregate carrying net and the supporting net to enable adhesion bonding between the decorative aggregates and the decorative aggregate carrying net and between the supporting net and the decorative aggregate carrying net by a bonding step only for once.

The mat for decorative aggregate exposed finishes in accordance with the present invention is used, for example, by a method of placing the mat with the decorative aggregates being on the outer side on mortar coated uniformly to already applied concretes, applying pressure, vibration or the like and burying a portion of the net and the decorative aggregates into mortar, or casting mortar over the mat and then exposing the decorative aggregates to the surface by washing. Accordingly, it is necessary that the mesh size of the decorative aggregate carrying net is such that mortar can move easily through the mesh, so that the mesh size is desirably greater than 2 mm. Further, it is necessary that the upper limit for the mesh size is smaller than the particle size of the decorative aggregates so that the decorative aggregates can be retained firmly. In addition, it is also desirable that the mesh size of the supporting net is more than 2 mm so as not to give any effect on the passage of mortar.

DETAILED DESCRIPTION OF THE PREFERRED EMBODIMENTS

Figure 1:
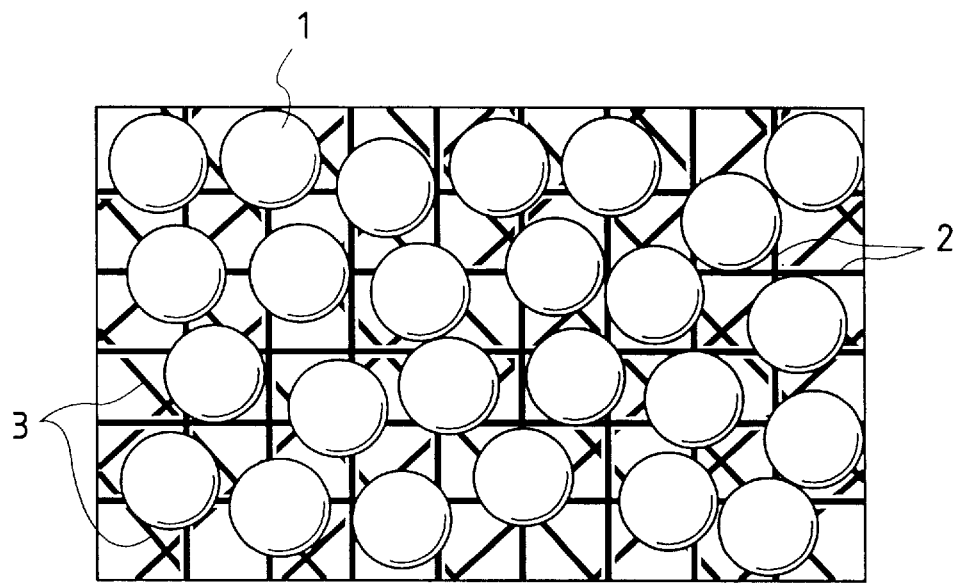
FIG. 1 is a schematic view illustrating a plane constitution of a mat for decorative aggregate exposed finishes as a preferred embodiment of the present invention.
Figure 2:
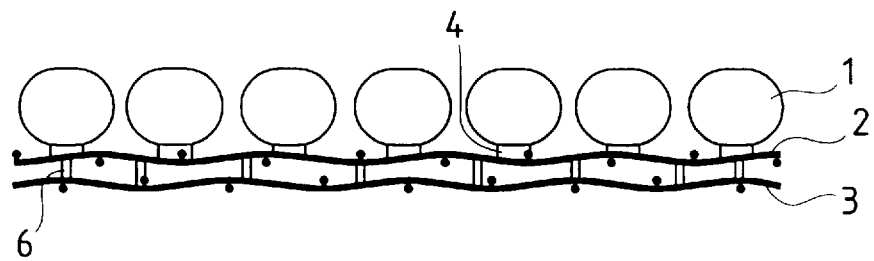
FIG. 2 is a schematic view illustrating a cross sectional constitution of a mat for decorative aggregate exposed finishes as a preferred embodiment of the present invention.

FIG. 1 and FIG. 2 schematically show a preferred embodiment of a mat for decorative aggregate exposed finishes. FIG. 1 is a plan view and FIG. 2 is a cross sectional constitutional view of FIG. 1. In the drawings, are shown decorative aggregates 1 such as made of natural pebbles, a decorative aggregate carrying net 2, supporting net 3, an adhesive 4, and an adhesive 6 used in adhesively bonding step between the supporting net 3 and the decorative aggregate carrying net 2.

Figure 3A:
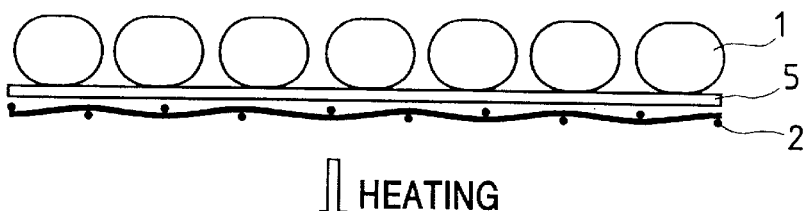
FIG. 3 (*a*) and (*b*) is a step chart illustrating the process for manufacturing a mat for a decorative aggregate exposed finishes as a preferred embodiment of the present invention.
Figure 3B:
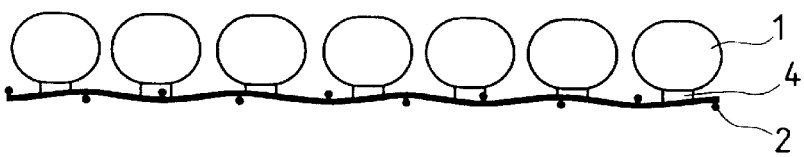

Further, FIGS. 3 (*a*) and (*b*) schematically show a method of manufacturing a mat for decorative aggregate exposed finishes in accordance with the present invention shown in FIG. 1 and FIG. 2. That is, the hot melt adhesive film 5 is placed on the decorative aggregate carrying net 2, on which the decorate aggregates 1 are placed (FIG. 3*a*). Then, when the entire portion is heated to a temperature higher than the melting point of the hot melt adhesive film 5, the film 5 is melted to adhesively bond the decorative aggregate carrying net 2 and the decorative aggregates 1. The adhesive concerned with adhesion bonding is illustrated as 4. The hot melt adhesive film 5 covering the entire surface of the decorative aggregate carrying net 2 is melted to be gathered on the net fibers and the decorative aggregate 1 to leave the mesh of the net open.

Figure 4A:
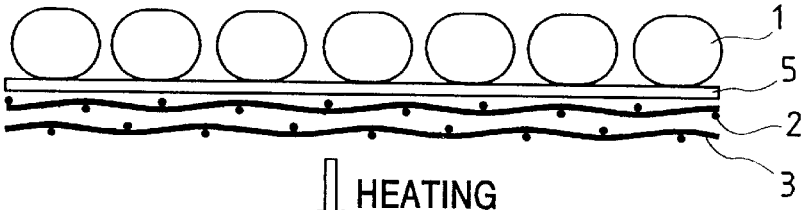
FIG. 4 (*a*) and (*b*) is a step chart illustrating the process for manufacturing a mat for a decorative aggregate exposed finishes as another preferred embodiment of the present invention.
Figure 4B:
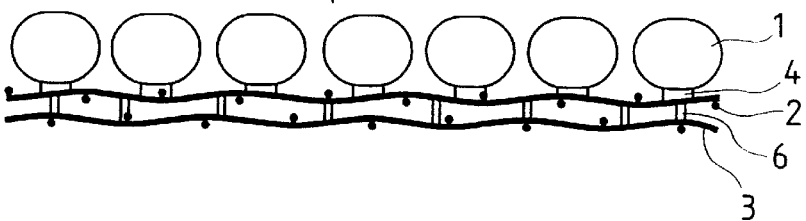

FIGS. 4 (*a*) and (*b*) schematically show another method of manufacturing a mat for decorative aggregate exposed finishes according to the present invention. In FIG. 4(*a*), the supporting net 3 is placed below the decorative aggregate carrying net 2. When they are heated in the same manner as in FIGS. 3 (*a*) and (*b*), the hot melt adhesive film 5 is melted to adhesively bond the decorative aggregate carrying net 2 and the decorative aggregate 1, as well as adhesively bond the decorative aggregate carrying net 2 and the supporting net 3. The adhesives concerned with adhesion bonding is illustrated by 4 and 6.

The present invention will be explained more specifically by way of examples.

EXAMPLE 1

A hot melt adhesive film of about 50 $\mu$m thickness comprising an elastomer of a styrene/butadiene/styrene block copolymer having a softening point at about 50° C. was placed on a net made of alkali resistant glass fibers having a mesh size of 5 mm, and natural stones of about 12 mm particle size were uniformly placed on the adhesive film and heated at 100° C. for 20 min. By this procedures, the glass net and the natural stones could be adhesively bonded firmly. They were cooled to obtain a mat for natural stone exposed finishes.

EXAMPLE 2

After placing a net made of alkali resistant glass fibers having mesh size of about 5 mm on a polyester net having a mesh size of about 10 mm, a hot melt adhesive film of about 50 $\mu$m thickness comprising an elastomer of a styrene/butadiene/styrene block copolymer having a softening point at about 50° C. was placed on a net made of alkali resistant glass fibers having a mesh size of 5 mm, and natural stones of about 12 mm particle size were uniformly placed on the adhesive film and heated at 100° C. for 20 min. The procedure enabled firmly adhesion bonding between the glass net and the natural stones and between glass net and polyester net respectively, cooling to obtain a mat for natural stone exposed finishes.

Mats manufactured in Examples 1 and 2 were laid respectively on mortar placed to a thickness of about 3 mm on previously applied concretes and given with vibrations while pressing from above to sink the natural stones into mortar, and the surface of the mortar was washed out while it was not yet cured, to obtain concretes in which the natural stones were exposed each about $\frac{2}{3}$ of the particle size.

According to the present invention, a practical mat for decorative aggregate exposed finishes in which decorative aggregates are adhesively bonded firmly on one surface of the decorative aggregate carrying net can be manufactured industrially by using the hot melt adhesive film, which can be used effectively, for example, to decorative aggregate exposed concretes.

What is claimed is:

1. A method of manufacturing a mat for decorative aggregate exposed finishes, which comprises the steps of placing a hot melt adhesive film on one surface of a soft and flexible decorative aggregate carrying net having a mesh size smaller than the particle diameter of decorative aggregates and greater than 2 mm placing decorative aggregates on the hot melt adhesive film and heating the entire portion to a temperature higher than the melting point of the hot melt adhesive, thereby adhesively bonding the decorative aggregates and the carrying net.

2. A method of manufacturing a mat for decorative aggregate exposed finishes which comprises the steps of placing a soft and flexible decorative aggregate carrying net having a mesh size smaller than the particle size of decorative aggregates and greater than 2 mm on a supporting net having a mesh size of greater than 2 mm, placing a hot melt adhesive film on the upper surface of the decorative aggregate carrying net, placing decorative aggregates on the hot melt adhesive film and heating the entire portion to a temperature higher than the melting point of the hot melt adhesive, thereby adhesively bonding the decorative aggregates with the decorative aggregate carrying net and the supporting net.

3. A method of manufacturing a mat for decorative aggregate exposed finishes as defined in claim 1 or 2, wherein the decorative aggregate carrying net or the supporting net comprises at least one of fibers selected from the group consisting of alkali resistant glass fibers, carbon fibers, aramide fibers, polyester fibers, vinylon fibers, nylon fibers and polypropylene fibers.

* * * * *